US011941952B2

(12) United States Patent
Galfond et al.

(10) Patent No.: US 11,941,952 B2
(45) Date of Patent: *Mar. 26, 2024

(54) SPORTS CONTEST INTERFACE SYSTEM AND METHOD

(71) Applicant: Draftboard, LLC, Paso Robles, CA (US)

(72) Inventors: Philip Galfond, Las Vegas, NV (US); Dan Quinn, Paso Robles, CA (US)

(73) Assignee: DRAFTBOARD, LLC, Paso Robles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/643,005

(22) Filed: Dec. 7, 2021

(65) Prior Publication Data

US 2022/0101697 A1 Mar. 31, 2022

Related U.S. Application Data

(63) Continuation of application No. 16/115,368, filed on Aug. 28, 2018, now Pat. No. 11,244,537.

(60) Provisional application No. 62/551,160, filed on Aug. 28, 2017.

(51) Int. Cl.
*G07F 17/32* (2006.01)

(52) U.S. Cl.
CPC ...... *G07F 17/3288* (2013.01); *G07F 17/3211* (2013.01); *G07F 17/323* (2013.01)

(58) Field of Classification Search
CPC ............... G07F 17/3288; G07F 17/323; G07F 17/3211; A63F 13/65; A63F 2300/69
See application file for complete search history.

(56) References Cited

U.S. PATENT DOCUMENTS

| | | | | |
|---|---|---|---|---|
| 11,244,537 B2 * | 2/2022 | Galfond | .............. | G07F 17/3288 |
| 2008/0161113 A1 * | 7/2008 | Hansen | ................. | A63F 13/335 463/42 |
| 2012/0009984 A1 | 1/2012 | Amaitis et al. | | |

(Continued)

OTHER PUBLICATIONS

GhostRobo; Madden NFL 12 Ultimate Team Walkthrough—Part 2 (Our First Game!); Aug. 30, 2011 https://www.youtube.com/watch?v=kMSxuAAaUzE (Year: 2011).*

(Continued)

*Primary Examiner* — Jasson H Yoo
(74) *Attorney, Agent, or Firm* — Davis Wright Tremaine LLP

(57) ABSTRACT

A method of providing different customized display presentations for a sports contest that includes generating a different customized presentation for each respective user account of a plurality of user accounts including one or both of a representation of at least one user sports player for the sports contest and a representation of at least one opponent sports player for the sports contest. Each of the different customized presentations are different based on one or both of the identity and different real-time game actions of the different plurality of user sports players and the identity and different real-time game actions of the at least one opponent sports player. The different customized presentations include one or both of an animation depicting the representation of the at least one user sports player for the sports contest and the representation of the at least one opponent sports player for the sports contest.

20 Claims, 9 Drawing Sheets

(56) References Cited

U.S. PATENT DOCUMENTS

| | | | |
|---|---|---|---|
| 2013/0324245 | A1 | 12/2013 | Harvey et al. |
| 2014/0370966 | A1 | 12/2014 | Bahou |
| 2017/0128840 | A1 | 5/2017 | Croci et al. |

OTHER PUBLICATIONS

GhostRobo; Madden NFL 12 Ultimate Team Walkthrough—Part 1 (Building the Team); Aug. 30, 2011 https://www.youtube.com/watch?v=t7NNIpA9gxg (Year: 2011).*

CJ Blaze; BackBreaker Split Screen; Oct. 26, 2012 https://www.youtube.com/watch?v=JAqKUHfwFYA (Year: 2012).*

* cited by examiner

SPORTS CONTEST INTERFACE SYSTEM AND METHOD

CROSS-REFERENCE TO RELATED APPLICATIONS

This application is a continuation of U.S. patent application Ser. No. 16/115,368 filed Aug. 28, 2018, which is a non-provisional of, and claims the benefit of U.S. provisional Patent Application No. 62/551,160, filed Aug. 28, 2017, each of which applications is hereby incorporated herein by reference in their entirety and for all purposes.

This application is related to U.S. application Ser. No. 15/622,514, filed Jun. 14, 2017, which is a non-provisional of and claims the benefit of U.S. Provisional Application No. 62/351,497, filed Jun. 17, 2016. These applications are hereby incorporated herein by reference in their entirety and for all purposes.

BACKGROUND

In conventional fantasy sports games, players compete against others by building a team of professional athletes from a particular league or competition while remaining under a salary cap, and earn points based on the actual statistical performance of the players in real-world competitions. Daily fantasy sports are an accelerated variant of traditional fantasy sports that are conducted over short-term periods, such as a week or single day of competition, as opposed to those that are played across an entire season. Daily fantasy sports are typically structured in the form of paid competitions typically referred to as a "contest," where winners receive a share of a pre-determined pot funded by their entry fees. A portion of entry fee payments go to the provider as rake revenue.

However, conventional fantasy sports systems fail to provide displays and interfaces that adequately engage users. In view of the foregoing, a need exists for an improved fantasy sports interface system and method for generating desirable displays and interfaces to overcome the aforementioned obstacles and deficiencies of conventional fantasy sports systems.

Figure 1:
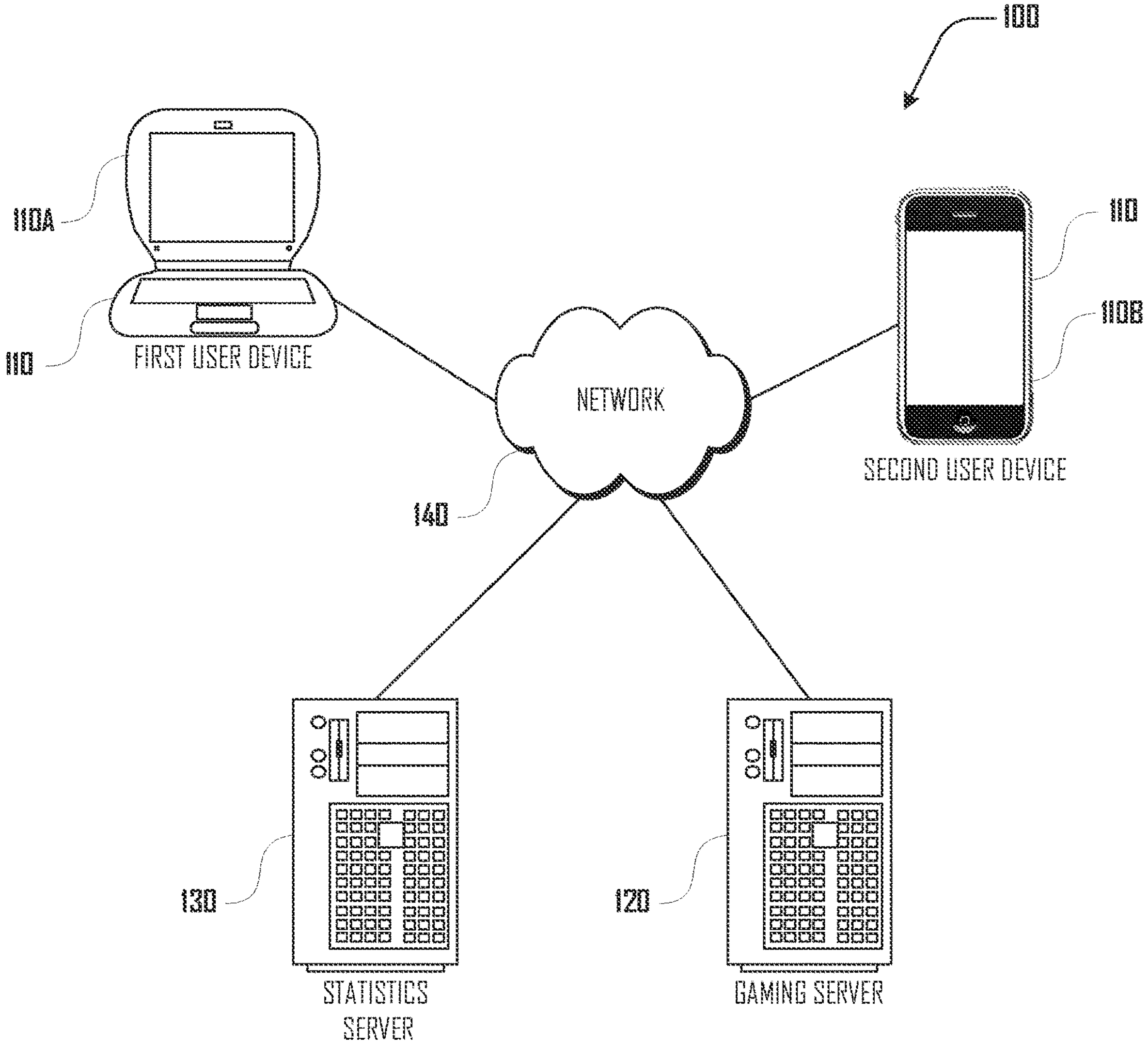
FIG. 1 is an example diagram illustrating an embodiment of a fantasy sports gaming system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Various embodiments disclosed herein relate to systems and methods for presenting fantasy sports contest action, which can include presentation of events that occur in real-life sports games that are associated with a given user and the user's opponents. Such systems and methods can provide for customized displays for a plurality of fantasy sports users based at least in part on sports players that the user selects for a given content and sports players selected by opponents in such contests.

Presentation of sports events can include animations, images, text, audio and the like. In some embodiments, such presentations can include sports plays, one or more fantasy sport user's lineup, one or more lineup's fantasy point score, depiction of increases or decreases in a user's fantasy point score, similar data for the daily fantasy sport user's opponents, and the like.

Turning to FIG. 1, a fantasy sports gaming system 100 is shown as comprising a first and second user device 110, a gaming server 120 and a statistics server 130, which are operably connected via a network 140. Although the user devices 110A, 110B are shown as being a laptop computer and smartphone respectively, in further embodiments any suitable device can serve as a user device 110 including a desktop computer, laptop computer, smart phone, tablet computer, gaming device, wearable computer, home automation system, vehicle computer, and the like. Additionally, in various embodiments, there can be any suitable plurality of user devices 110.

The gaming and statistics servers 120, 130 can comprise any suitable server device, which can include one or more physical server, cloud computing service, or the like. In various embodiments, the gaming and statistics servers 120, 130 are separate servers operated by separate entities, but in some embodiments the gaming and statistics servers 120, 130 can be the same server. Additionally, in some embodiments, a plurality of servers can perform the functions of the gaming server 120 as described herein. The network 140 can comprise any suitable wired and/or wireless network including the Internet, a cellular network, a WiFi network, a Local Area Network (LAN), a Wide Area Network (WAN), a Bluetooth network, and the like.

Although the example gaming system 100 of FIG. 1 illustrates only a first and second user device, in various embodiments, the gaming system 100 can comprise a large plurality of user devices 110, which can respectively be associated with one or more user accounts for a gaming service, which in one preferred embodiment can comprise a daily fantasy sports gaming service. A user can sign into a user account on a user device 110, which can allow the user to play fantasy sports games as discussed herein. The user device 110 can be configured for the user to provide payments, receive payments and the like, which can be done via a bank account, cryptographic currency, credit card, debit account, or the like.

Accordingly, a gaming system 100 of further embodiments can allow a plurality of users to play fantasy sports games together via a set of user devices 110 where such fantasy sports games are moderated or facilitated by the gaming server 120 and where interfaces and displays related to fantasy sports games can be presented on the user devices 110. Such fantasy sports games can include any suitable sport, including baseball, basketball, football, soccer, hockey and the like. Although various examples discussed herein relate to competing against other users in fantasy sports contests, further embodiments can be applied to competing against the house or other users in sports betting related applications.

Figure 2:
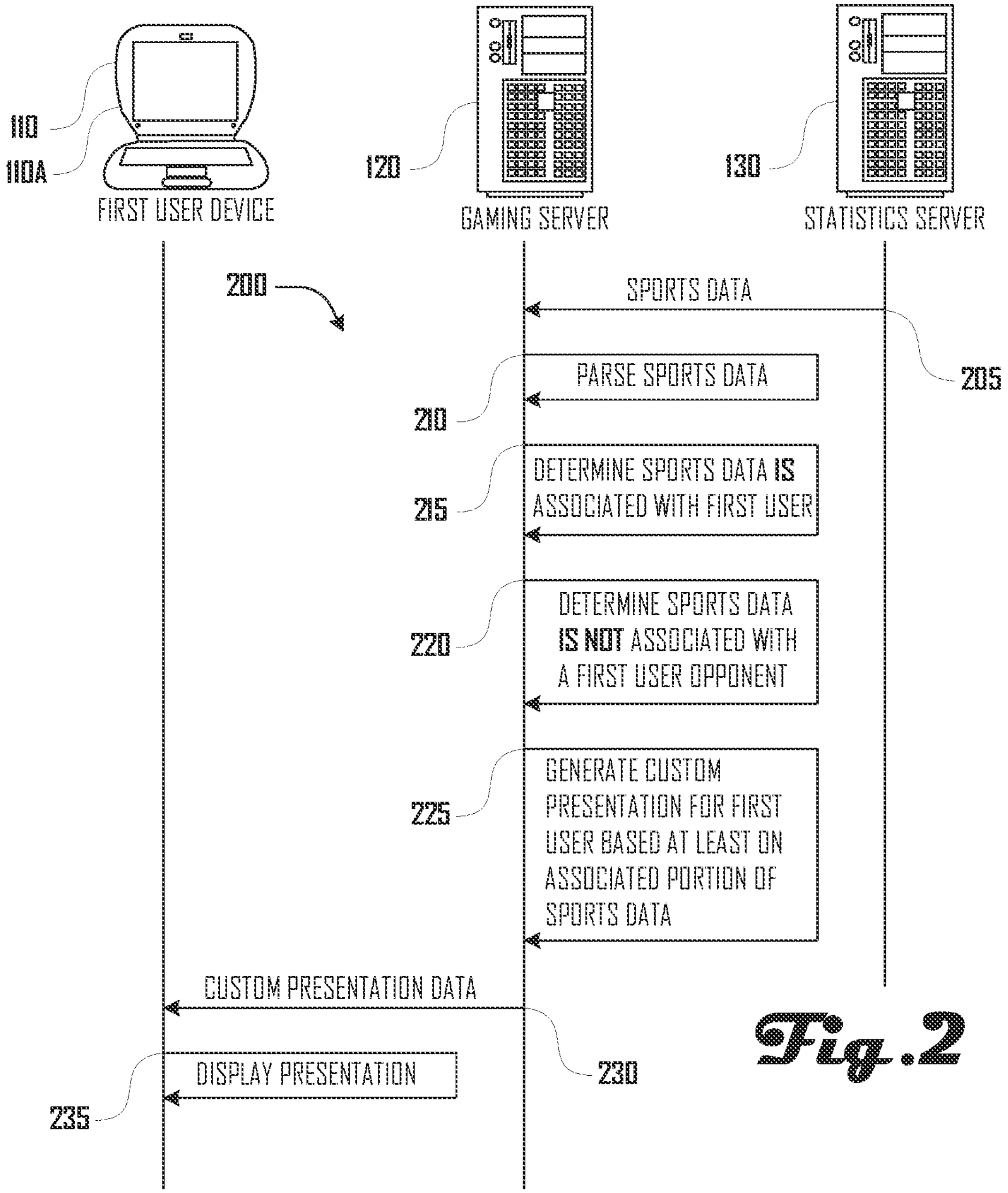
FIG. 2 is a data flow diagram that illustrates a series of communications in one embodiment that can occur when a statistics server communicates with a gaming server that communicates with a first user device to present a game interface and display at the user device.

FIG. 2 is a data flow diagram that illustrates a series of communications 200 in one embodiment that can occur when a statistics server 130 communicates with a gaming server 120 that communications with a first user device 110A to generate a presentation at a game interface at the user device 110A. These example communications 200 should not be construed to be limiting on the wide variety of communications that are within the scope and spirit of the present disclosure. For example, as discussed in other examples, (e.g., FIG. 4) some of the actions of these example communication 200 can be performed at the first user device 110A instead of at the gaming server 120.

The example communications 200 begin where sports data is sent 205 from the statistics server 130 to the gaming server 120. For example, such a statistics server 130 can be associated with a company such as Sport Radar, the Entertainment and Sports Programming Network (ESPN) or a sporting association such as the National Football League (NFL), the National Basketball Association (NBA), Major League Baseball (MLB), National Hockey League (NHL), Major League Soccer (MLS), Federation Internationale de Football Association (FIFA), Stats LLC, or the like.

Such companies can provide a service of providing real-time or near-real-time sports data. In other words, as sporting events are occurring, sports data associated with or observed at the sporting event can be recorded and stored at the statistics server 130, and such data can be made available to other devices for use (e.g., the gaming server 120). Some statistics servers 130 can act as an official or unofficial source of sports data for one or more sports or can be an aggregator of sports data from one or more other statistics servers 130. Additionally, some statistics servers 130 can be focused on one specific sport (e.g., baseball, basketball, football, soccer, hockey, and the like). Accordingly, in further embodiments, there can be any suitable plurality of statistics servers 130 that provide sports data to the gaming server 120 either directly or indirectly.

Examples of sports data, sports statistics, and the like can include any suitable information about sports, sporting events, sports players, sports teams, sports leagues, or the like. In various embodiments, sports data can include information about sports plays or events that occur during a sporting event. For example, for a football game, sports data can include data about a given passing play, including players from one or both teams involved in the play, actions that the players performed, a change in ball position caused by a given player, ball position at the beginning and end of the play, point scoring by a player, penalties incurred by a player, and the like. Accordingly, sports data can include actions or events that are attributed to one or more sports player.

In one specific football game example, a play in a game involving the Carolina Panthers can include the football starting on the Panther's 30-yard line, with the ball being snapped and received by quarterback Cam Newton, who drops back to the Panther's 20-yard line and throws the ball to team member Kelvin Benjamin, who catches the ball at the opposing team's 40-yard line and runs to opposing team's 20-yard line before being tackled by opposing team member Richard Sherman to stop the play.

In such a play, the acting players can have actions attributed to them. For example, player Cam Newton can be attributed with one or more of the actions, including completing a 40 yard pass, facilitating a total yardage gain of 50 yards, facilitating a run of 20 yards, not being sacked, not throwing an interception, and the like. Similarly, player Kelvin Benjamin can be attributed with one or more actions, including successfully catching a pass, running the ball 20 yards, facilitating a total yardage gain of 50 yards, not fumbling the ball, and the like. Additionally, opposing team member Richard Sherman can also be attributed with the action of tackling Kelvin Benjamin at the 20-yard line. Also, other players indirectly involved in the play can also be attributed with actions, including tackles, blocks, and the like. In some embodiments, in addition to players being attributed with actions, teams, coaches, owners, or the like, can also be attributed with actions. Sports data can relate to any set of sports data, including a single player action attribute or a set of player action attributes (e.g., for a given game play).

As discussed herein, fantasy sports and daily fantasy sports can include contests where a user selects players from one or more team and receives points (or loses points) based on the actions of the selected players during a given time period (e.g., a day, week, month, season, or the like). In some examples, players can be on different sports teams and even on teams that are competing against each other in a game during the contest periods. Accordingly, fantasy sports games can be based on sports data received from one or more statistics servers 130.

Additionally, as discussed herein, fantasy sports and daily fantasy sports can include contests having two or more user compete with each other. For example, some preferred embodiments include contests having ten users. In various examples, there can be one or more winner based on points accumulated by each contestant user during a given contest based on sports data received from one or more statistics servers 130.

Returning to the communications 200 of FIG. 2, the sports data received at the gaming server 120 is parsed 210. For example, the sports data can include metadata, and the like, which may not be relevant to use by the gaming server and such metadata can be removed or otherwise modified during such parsing. Additionally, parsing sports data can include converting a format of the data, adding metadata to the sports data or other suitable transformation, editing, modification, or the like.

The communications 200 continue where it is determined 215 that the sports data is associated with a first user, and then determined 220 that the sports data is not associated with a first user opponent. The gaming server then generates 225 a custom presentation for the first user based on the sports data associated with the first user and custom presentation data is sent 230 to the first user device 110A, where the presentation is displayed 235.

For example, using the Cam Newton/Kelvin Benjamin football pass play example discussed above, for a given contest, assume that the first user has selected Cam Newton as a player for the contest but has not selected Richard Sherman or Kelvin Benjamin as a player for the contest. Additionally, no first user opponents have selected Cam Newton, Kelvin Benjamin or Richard Sherman for the contest. Accordingly, where sports data is received that comprises sports data related to the play discussed above, a determination can be made that Cam Newton is associated with the first user for an active contest and that Cam Newton, Kelvin Benjamin, and Richard Sherman are not associated with any first user opponents for active contests.

Since in various embodiments, the user will score points in the contest based on the actions performed by Cam Newton, a presentation can be generated for the first user associated with such actions, which as discussed in more detail herein can include an indication of points scored based on the actions of Cam Newton, an animation indicating the actions performed by Cam Newton, and the like.

In some embodiments, an animation of the play will not include the actions of Kelvin Benjamin or Richard Sherman because they are not players of the first user and because they are not players of a first user opponent. However, in other embodiments, such an animation can include the actions of one or both of Kelvin Benjamin or Richard Sherman to provide context to the play being illustrated, even though such players are not selected players of the first user and are not players of a first user opponent. As discussed in more detail herein, such animations can include an indication (e.g., via color coding, or the like) of which players are associated with an active contest of the user, which players are associated with an opponent user, and which players are not associated with either the user or an opponent user.

Figure 3:
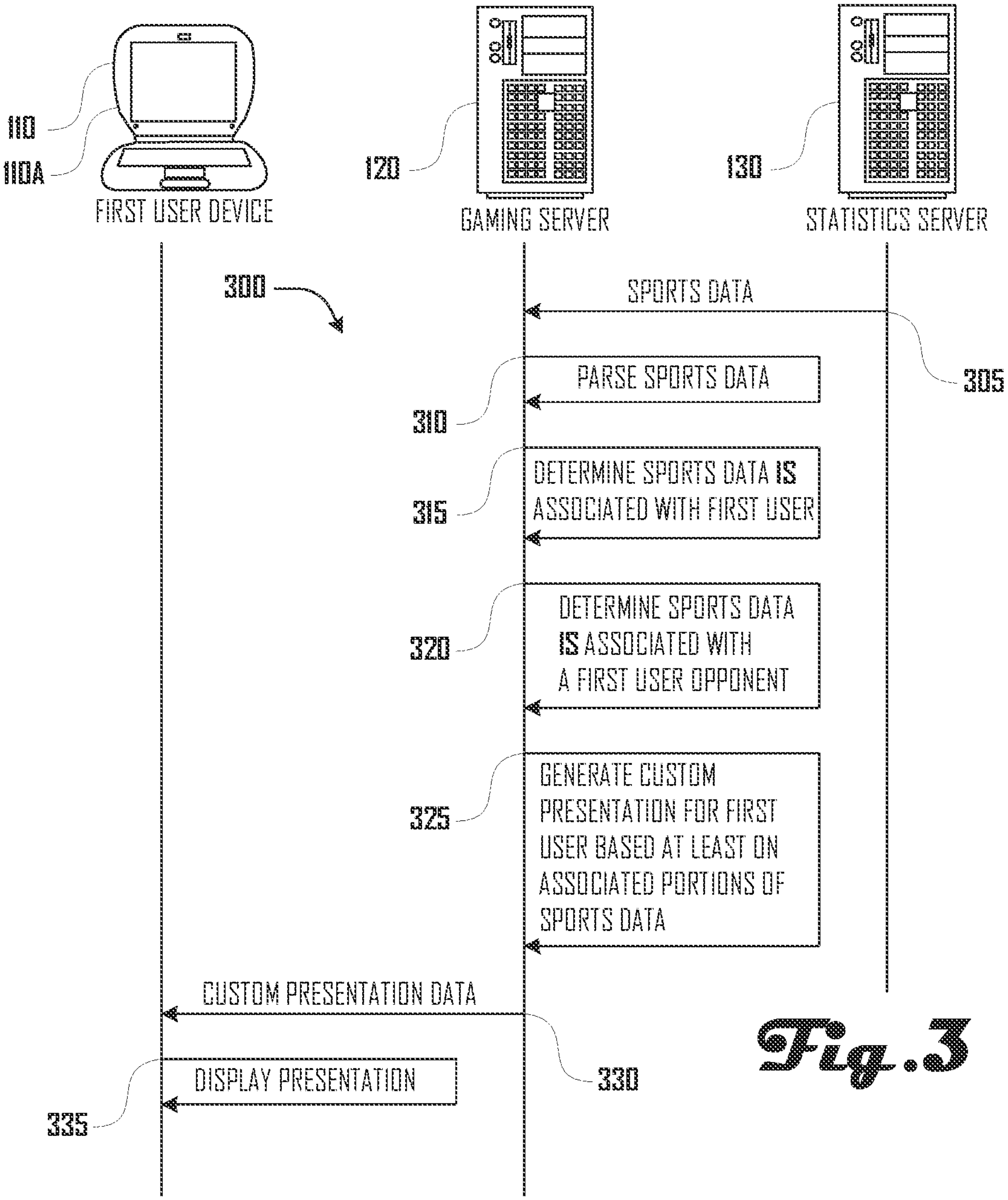
FIG. 3 is a data flow diagram that illustrates a series of communications in another embodiment that can occur when a statistics server communicates with a gaming server that communicates with a first user device to present a game interface and display at the user device.

FIG. 3 is a data flow diagram that illustrates a series of communications 300 in another embodiment that can occur when a statistics server 130 communicates with a gaming server 120 that communications with a first user device 110A to generate a presentation in a game interface at the user device 110A. The communications 300 begin where sports data is sent 305 from the statistics server 130 to the gaming server 120 where the sports data is parsed 310 and a determination 315 is made that a portion of the sports data is associated with an active contest of the first user. In contrast to the communications in FIG. 2, a determination 320 is also made that a portion of the sports data is associated with at least one first user opponent in an active contest of the first user. A custom presentation for the first user is generated 325 based at least on the portions of the sports data associated with the first user and the one or more first user opponents. Custom presentation data is sent 330 to the first user device 110A and displayed 335.

For example, using the Cam Newton/Kelvin Benjamin football pass play example discussed above. For a given contest, assume that the first user has selected Cam Newton as a player for an active contest but has not selected Richard Sherman or Kelvin Benjamin as a player for the active contest. Additionally, no active first user opponents have selected Cam Newton or Kelvin Benjamin, but at least one opponent has selected Richard Sherman for a contest. Accordingly, where sports data is received that comprises sports data related to the play discussed above, a determination can be made that Cam Newton is associated with the first user for an active contest, that Richard Sherman is associated with an active user opponent, and that Kelvin Benjamin is not associated with any active first user contests or any first user opponents for active first user contests.

Since in various embodiments, the user will score points in an active contest based on the actions performed by Cam Newton, a presentation can be generated for the first user associated with such actions, which as discussed in more detail herein can include an indication of points scored based on the actions of Cam Newton, an animation indicating the actions performed by Cam Newton, and the like. Additionally, since an opponent may score points (or the first user may lose points) in an active contest based on the actions performed by Richard Sherman, a presentation can be generated for the first user associated with such actions, which as discussed in more detail herein can include an indication of points scored by an opponent based on the actions of Richard Sherman, an animation indicating the actions performed by Richard Sherman, and the like. However, in other embodiments, points scored by opponents and actions of opponent players may not be displayed.

In some embodiments, an animation of the play will not include the actions of Kelvin Benjamin because, in this example, he is not a player of the first user and because he is not a player of a first user opponent. However, in some embodiments, such an animation can include the actions of Kelvin Benjamin to provide context to the play being illustrated, even though such a player is not a selected player of the first user and is not a player of a first user opponent. As discussed in more detail herein, such animations can include an indication (e.g., via color coding, or the like) of which players are associated with an active contest of the user, which players are associated with an opponent user, or which players are not associated with either the user or an opponent user.

Figure 4:
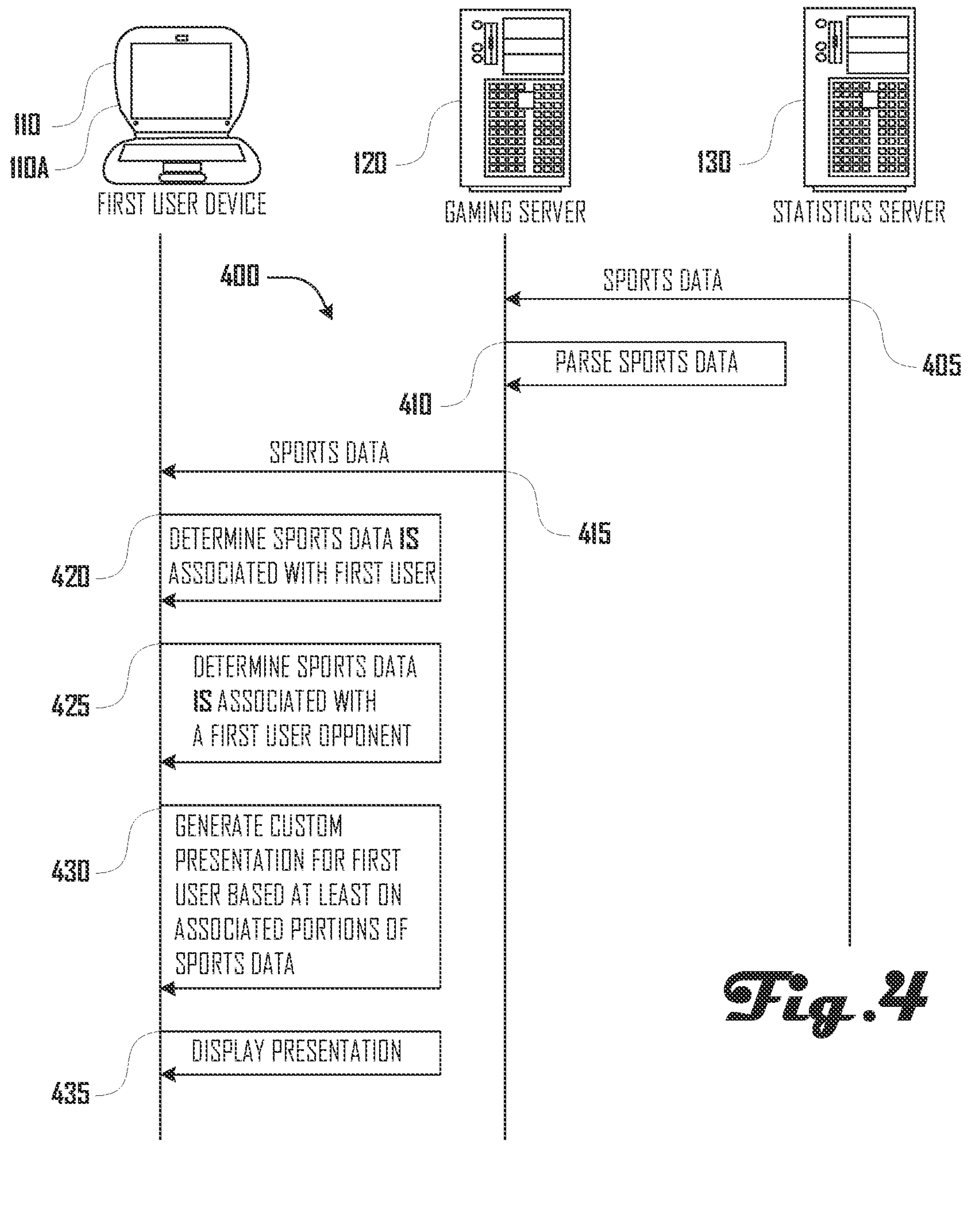
FIG. 4 is a data flow diagram that illustrates a series of communications in a further embodiment that can occur when a statistics server communicates with a gaming server that communicates with a first user device to present a game interface and display at the user device.

Additionally, in further embodiments, various actions can be performed at a user device 110 instead of at the gaming server 120 as shown in the examples of FIGS. 2 and 3. For example, FIG. 4 is a data flow diagram that illustrates a series of communications 400 in a further embodiment that can occur when a statistics server 130 communicates with a gaming server 120 that communicates with a first user device 110A to generate a presentation in a game interface at the user device 110A. The communications 400 begin where sports data is sent 405 from the statistics server 130 to the gaming server 120 where the sports data is parsed 410 and sent 415 to the first user device. At the user device 110A, a determination 420 is made that a portion of the sports data is associated with an active contest of the first user and a determination 425 is also made that a portion of the sports data is associated with at least one first user opponent in an active contest of the first user. A custom presentation for the first user is generated 430 at the first user device 110A based at least on the portions of the sports data associated with the first user and the one or more first user opponents as discussed in detail herein and displayed 435 at the first user device 110A.

For example, in some embodiments, sports data messages can be pushed to a plurality of user devices 110 in real time (e.g., via web sockets). Each user device 110 receives the messages and checks to see if any of the players identified are in the user's (or opponent's) lineup that is currently being displayed. The message is discarded if there are none. In various embodiments, if the message is not discarded can be placed in a queue, and the user device 110 can cycle through this queue, displaying animations, score updates, and the like as discussed herein, based on what the message indicates. Sports data messages can be in various suitable forms, including a play-by-play message, and the like.

Accordingly, in some embodiments, the same (or substantially similar) sports data messages can be sent to a plurality of user devices 110 and custom presentations can be generated at each given user device 110 based on active contest of a user associated with the user device 110. However, in further embodiments (e.g., as shown in FIGS. 2 and 3) custom presentations can be generated at the gaming server 120 and sent to user devices associated with respective users.

Figure 5:
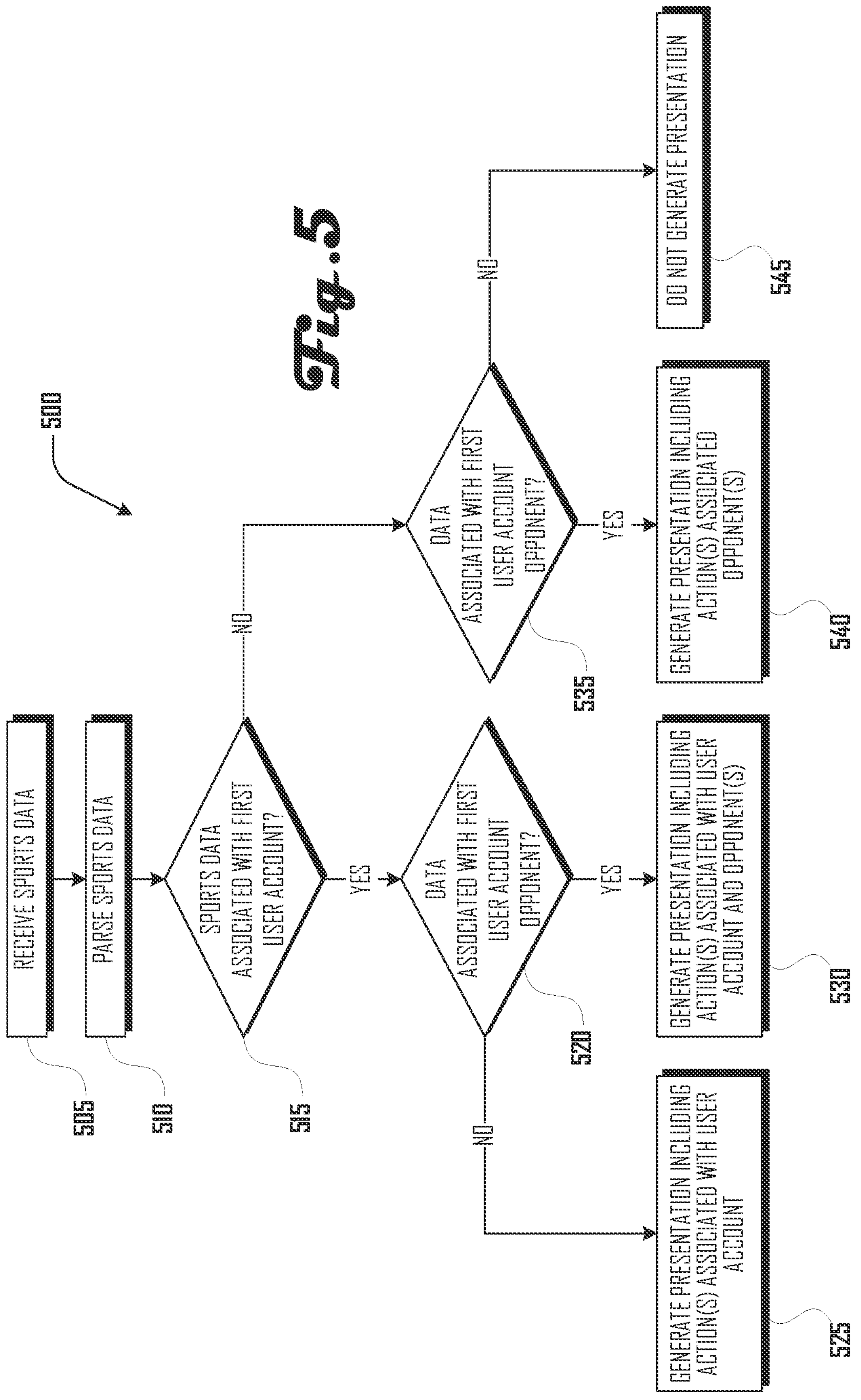
FIG. 5 is a block diagram that illustrates a method of generating a presentation in accordance with one embodiment.

FIG. 5 is a block diagram that illustrates a method 500 of generating a presentation in accordance with one embodiment. As discussed herein some or all of these method steps can be performed at a user device 110 or a gaming server 120 in accordance with various embodiments. The method 500 begins at 505 where sports data is received and continues to 510 where the sports data is parsed. At 515, a determination is made whether the sports data is associated with a first user account. If so, the method continues to 520, where a determination is made whether the sports data is associated with an active opponent of the first user account. If not, the method 500 continues to 525 where a presentation is generated including one or more actions associated with the user account. However, if so, the method 500 continues to 530 from 520 where a presentation is generated including one or more actions associated with the user account and associated with one or more opponents.

Returning to 515, if a determination is made that the sports data is not associated with the first user account, then the method 500 continues to 535, where a determination is made whether the sports data is associated with an active opponent of the first user account. If so, the method 500 continues to 540 where a presentation is generated including one or more actions associated with one or more active opponents. However, if not, the method 500 continues to 545 from 535 where a presentation is not generated.

For example, in some embodiments, sports data can be received at a user device 110 associated with a user account and the user device 110 can determine whether the received sports data is associated with one or more active contests of the user account and/or opponents in the one or more active contests of the user account. Based on the determination, a custom presentation may or may not be generated at the user device 110 based on a portion of the received sports data.

In further examples, sports data can be received at a gaming server 120 and the gaming server can determine whether the received sports data is associated with one or more active contests of a first user account and/or opponents in the one or more active contests of the first user account. Based on the determination, a custom presentation may or may not be generated at the gaming server 120 based on a portion of the received sports data and sent to a first user device 110 associated with the first user account. This process can be repeated for a plurality of user accounts associated with one or more respective user device 110.

Additionally, while FIG. 5 illustrates a determination (e.g., at 515) of whether sports data is associated with a given user account occurring before a determination of whether sports data is associated with an active opponent of the user account (e.g., 520 and 535), it should be clear that such determinations can be performed in reverse order or can be performed in parallel in further embodiments and that the example method 500 of FIG. 5 is only one example of a method that is within the scope and spirit of the present disclosure.

Additionally, in some embodiments, determinations as to whether sports data is associated with an active opponent of the user account (e.g., 520 and 535) can be absent. For example, where users do not or are not playing against opponents, such a determination may not be necessary. Additionally, where presentations related to an active opponent are not necessary or not desired, determinations as to whether sports data is associated with an active opponent of the user account can be absent.

Generating a presentation including one or more actions associated with a user account and/or with an active user opponent can be done in various ways. For example, as discussed herein, an interface at a user device 110 can present animations, text, images, audio, or the like, related to or indicating one or more actions associated with a user account and/or with an active user opponent. FIGS. 6-9 illustrate example embodiments of an interface that can be presented at a user device 110. However, these examples should not be considered limiting on the wide variety of presentations that are within the scope and spirit of the present disclosure.

Figure 6:
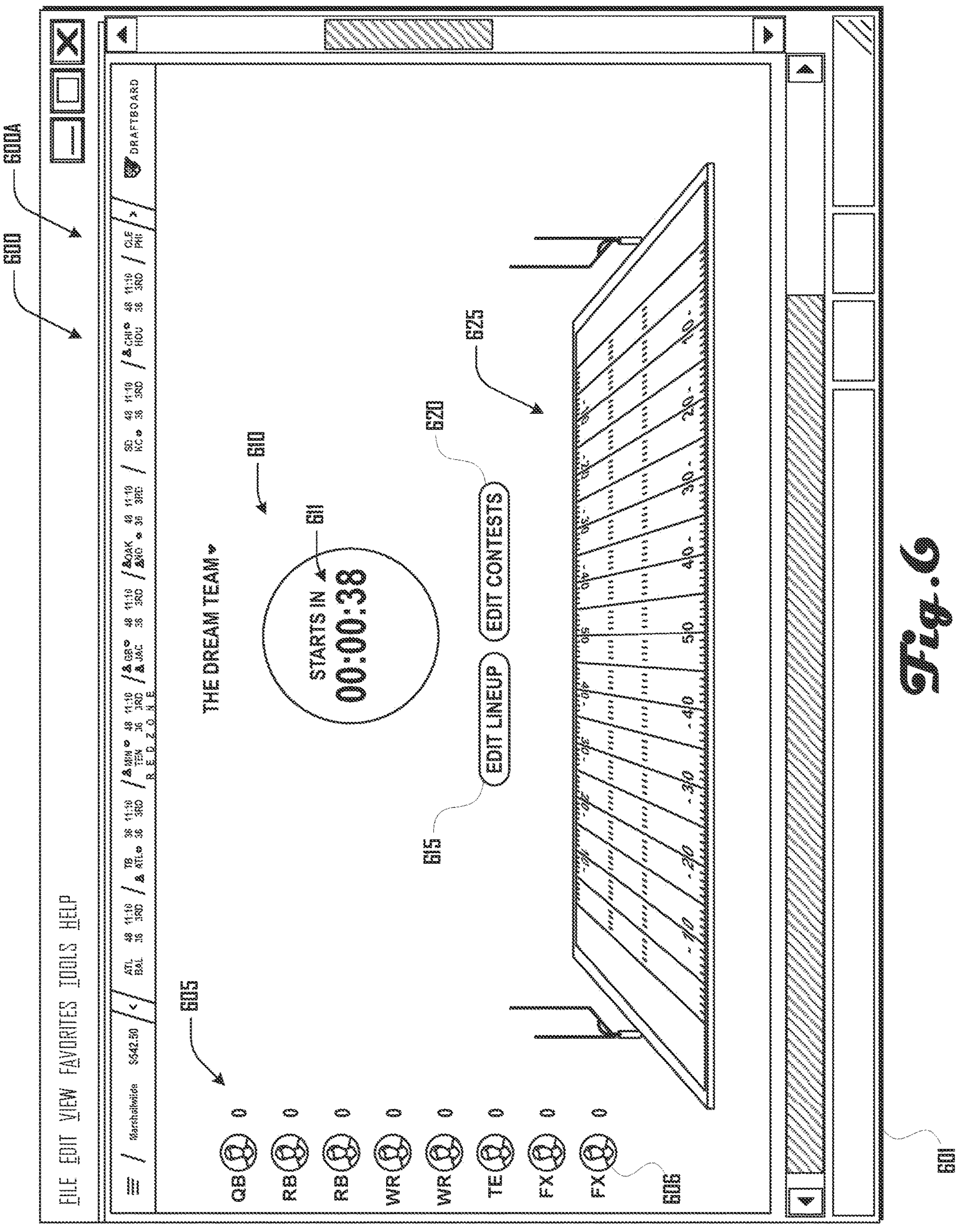
FIG. 6 is an illustration of an example user interface in accordance with one embodiment.

Turning to FIG. 6, and example interface 600A is shown presented in a browser 601. In this example, user "Marshallwilde" has created a lineup for a Sunday's set of NFL games. On the left side of the interface 600A, all players in his lineup are displayed in a user lineup field 605. A center field 610 can include a timer 611 for his game that can tick down to zero and his contests can begin. The user can also edit one or more lineup by clicking button 615 and can enter one or more contests by clicking button 620. A sports play-field 625 can be presented in the interface 600, which as discussed herein can be used to display one or more actions associated with a user account and/or one or more actions associated with an active user opponent.

Figure 7:
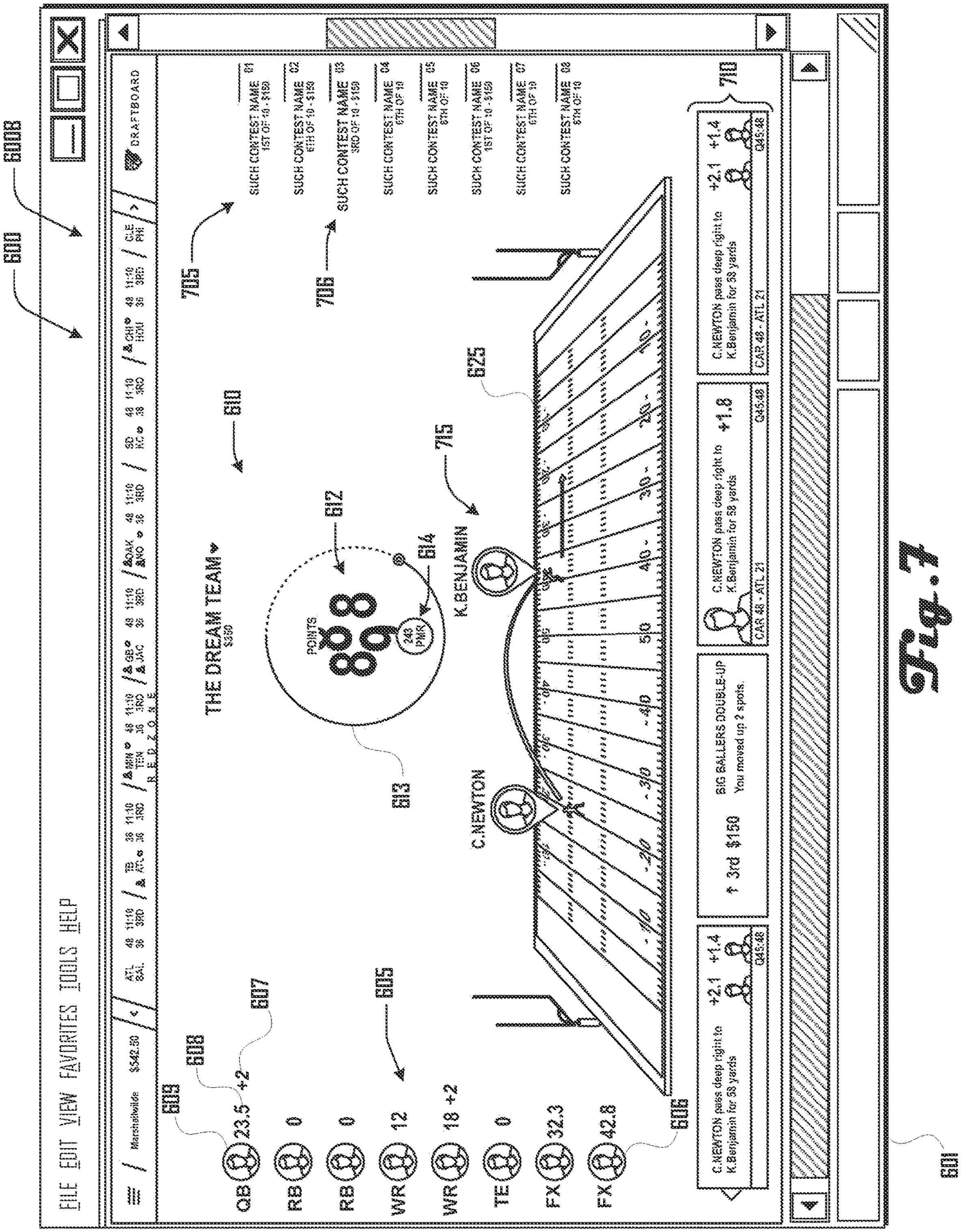
FIG. 7 is an illustration of an example game interface in accordance with another embodiment.

Turning to FIG. 7, another example interface 600B is illustrated. In this example, user "Marshallwilde" is shown having entered eight contests, which are displayed on the right side of the interface 600 in a contest field 705. In various embodiments, the contest field 705 can also present a user's place, current winnings, and the like, for each contest. Additionally, in some embodiments, a user can click on a specific contest in the contest field 705 and be taken to a dedicated page for that contest (e.g., FIGS. 8 and 9).

On the left, the user lineup field 605 can include recent point changes 607 for each player, point totals 608 for each player 606 and a percentage of game time remaining indicator 609 for each player 606. For example, a time remaining border 609 around the avatar of a given player 606 can indicate a percentage of game time remaining. Percentage of game time remaining can be calculated as minutes remaining in given player's real life game divided by total game time.

The center field 610 can contain the user's lineup name, total points his lineup has accrued in a points field 612, percentage of game time remaining in a center border 613, and his lineups PMR (player minutes remaining) in a PMR field 614.

Under the sports play-field 625, a set of tiles 710 can present data or information related to sports games, contests, players, opponents, fantasy sports, and the like. For example, as shown in FIG. 7, a set of plays that have occurred can be indicated on the selection of tiles 710 with each new additional tile pushing the set of tiles 710 to the left.

As discussed herein, the interface 600 can illustrate one or more actions associated with a user account and/or one or more actions associated with an active user opponent. Such actions can include game plays associated with a user's active players and/or one or more game plays associated with an active player of an opponent of the user. For example, a user device 110 can present a play animation 715 based on animation data received from the gaming server 120, presentation data received from the gaming server 120, sports data received from the gaming server 120, or the like.

In one example as shown in FIG. 7, a user device 110 can process a message from the gaming server 120 and can determine what kind of play to animate based on the current event's properties, which can include: players involved (Cam Newton and Kelvin Benjamin), play type (pass), was there a touchdown (no), play formation (not shotgun), which side of the field (left), how far was the pass, what side of the field was the pass to, how many yards after the catch did Kelvin gain, what were the starting and end lines, and the like.

Accordingly, various aspects of a given play can be animated. For example, FIG. 7 illustrates a static portion of an animation of a play 715 that can include an animation of Cam Newton dropping back from the line of scrimmage, and throwing the ball to Kelvin Benjamin, who catches the ball at approximately the 40-yard line and then runs the ball to approximately the 21-yard line.

Additionally, orientation of the animation 715 can be based on whether the one or more players associated with the play are active players of the user or active players of an opponent of the user. For example, in some embodiments, a play will be shown moving from left to right as shown in FIG. 7 if at least one player associated with the play is an active player of the user. Accordingly, in various examples, the orientation of an animated play in an interface 600 can be opposite of the orientation of the play in real life. For example, in sports like football, basketball and soccer, teams have scoring goals (e.g., end zones, field goals, goal boxes, baskets, and the like) at respective ends of the field for half of the game with the orientation of the scoring goals being switched at half-time of the game. In other words, Team A can begin the game attempting to score at the first side of the field and opposing Team B will begin the game attempting to score at the second side of the field. After half-time, Team A will then be attempting to score at the second side of the field and opposing Team B will then be attempting to score at the first side of the field. In contrast, animations in an interface can be presented based on whether one or more players associated with a play are active players of the user or active players of an opponent of the user and regardless of scoring orientation of play in real life.

In one example embodiment, plays will always be animated moving left to right if at least one player associated with the animation is an active player of the user and plays will always be animated moving right to left if no players associated with the animation are an active player of the user and at least one player associated with the animation is an active player of an opponent of the user.

For example, using FIG. 7 as an example, player Cam Newton in an active player for the user Marshallwilde and is determined to be relevant to the animation 715, player Kelvin Benjamin is also determined to be relevant to the animation, but is not currently associated with user Marshallwilde or an active opponent of Marshallwilde. Accordingly, the animation 715 can be presented as shown in FIG. 7 moving from left to right. However, if player Cam Newton was an active player for an active opponent of user Marshallwilde, and player Kelvin Benjamin is not currently associated with user Marshallwilde or an active opponent of Marshallwilde, then the play would be animated moving from right to left.

Additionally, active association with the user of the user device 110, active association with an active opponent, or neither such association can be indicated in an animation in various ways, including via colors, graphics, or the like. For example, where player Cam Newton actively belongs to user Marshallwilde, portions of the animation of player Cam Newton can be displayed in blue to indicate association with the user.

However, if player Cam Newton actively belonged to at least one of Marshallwilde's opponents, portions of the animation of player Cam Newton can be displayed in red to indicate association with the one or more opponents. Similarly, if player Kelvin Benjamin actively belonged to at least one of Marshallwilde's opponents, portions of the animation of player Kelvin Benjamin would also be displayed in red to indicate such association.

Similarly, lack of association can be indicated by a different color. For example, if player Kelvin Benjamin is presented in an animation 715 as shown in FIG. 7 and is not actively associated with the user or an active opponent of the user, then portions of the animation 715 of player Kelvin Benjamin can be displayed to indicate such lack of associations.

Figure 8:
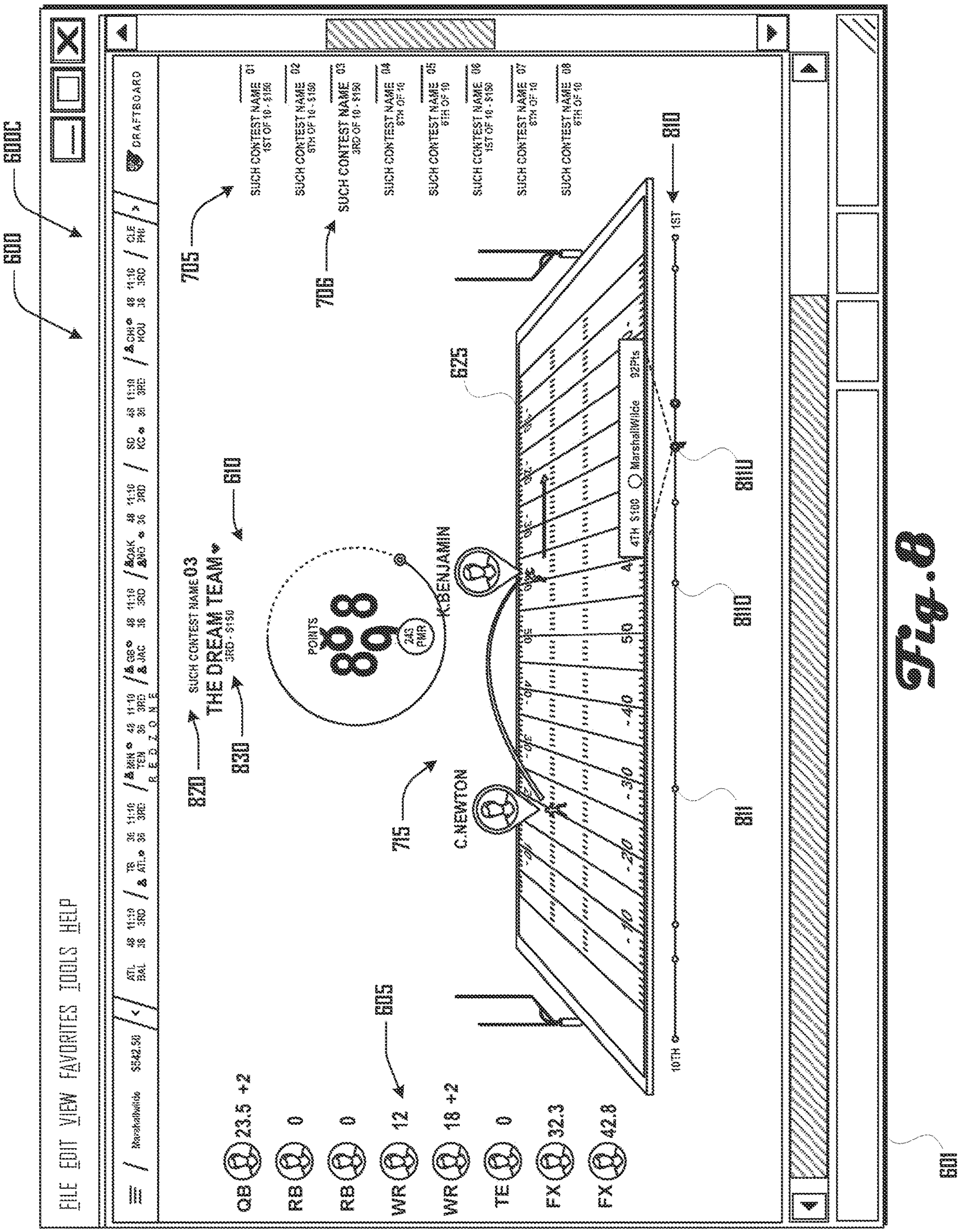
FIG. 8 is an illustration of an example game interface in accordance with a further embodiment.
Figure 9:
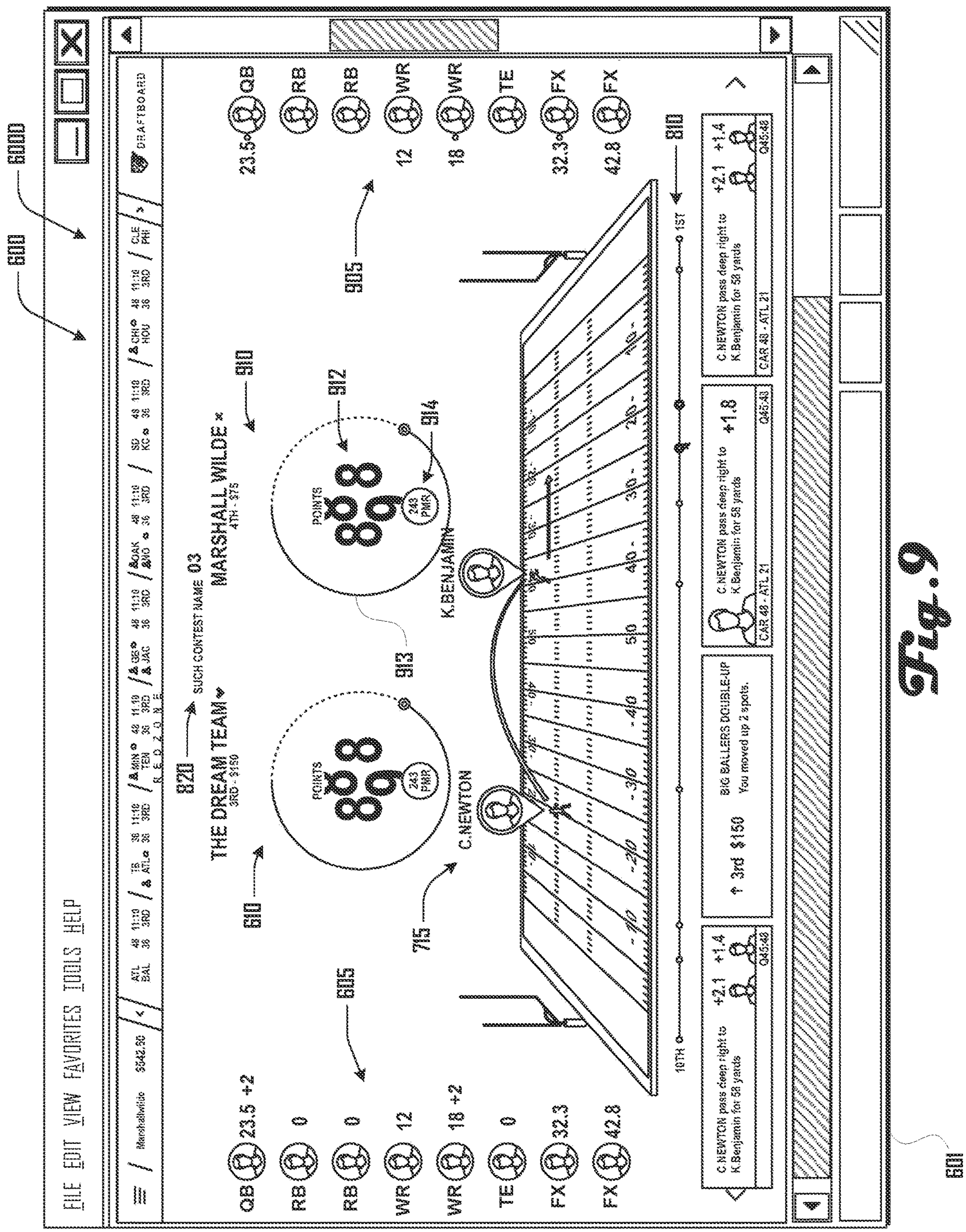
FIG. 9 is an illustration of an example game interface in accordance with yet another embodiment.

Turning to FIGS. 8 and 9, another embodiment of an interface 600D is illustrated which introduces a display for a single contest, which can comprise a money line 810, which in this example is shown being disposed under the sports play-field 625. The money line 810 can display a plurality of dots 811 representing the score of all contestants in a given contest. In the example of FIGS. 8 and 9, the money line 810 illustrates a contest having ten contestants illustrated by the ten dots 811 along the money line 810. Distance between the dots 811 can represent a point difference between respective contestants with a larger distance representing a larger point difference between respective contestants. The money line 810 can include a user dot 811U and a plurality of opponent dots 811O. The position of the dots 811 can change along the money line 810 as contestants of given contests gain and/or lose points.

The selected contest name 820 and the user's place in the contest 830 can be presented at the center field 610. The money line 810 can be anchored by the lowest point total in the contest on the left, with the highest on the right. In various embodiments, the money line 810 can be colored (e.g., colored green) between all spots which are currently "in the money" (i.e., currently in a position to win money in the contest if the contest were to end). As shown in the example of FIG. 8, the contest 706 is shown selected in the contest field 705 with the contest name 820 and the user's place in the contest 830 being presented at the center field 610.

In various embodiments, clicking an opponent's dot 811O on the money line 810 can cause the selected opponent's lineup to be displayed in an opponent lineup field 905 on the right side of the interface 600, as shown in the example embodiment 600D of FIG. 9. In various embodiments, the opponent lineup field 905 can mirror the user lineup field 605 on the left. Additionally an opponent status field 910 can be displayed that includes an opponent points field 912, percentage of game time remaining in an opponent center border 913, and opponent lineups PMR (player minutes remaining) in a PMR field 914.

In various embodiments, presentation of an animation 715 or other display associated with a play, action or other event related to a sports game can be based on a state of the interface 600. In one example, where the interface is in an overview configuration displaying information about a plurality of contests, animations 715 can be presented related to some or all of the plurality of contests. For example, where a user has entered eight contests (e.g., as shown in FIG. 7) and each contest has nine opponents that have each selected eight players for the contest (a total of 72 opponents, 576 opponent players and 64 user players), animations 715 of plays can be shown that relate to any of the opponent players and/or user players from any of the eight different contests.

However, in some embodiments, where an interface 600 is in a contest-level configuration (e.g., as shown in FIG. 8), presented animations 715 can be limited to opponent players and/or user players from a contest that is actively being displayed in the interface 600. (i.e., 9 opponents, 72 opponent players and 8 user players using the example above). In further embodiments, where an interface 600 is in a single-opponent configuration (e.g., as shown in FIG. 9), presented animations 715 can be limited to opponent players and/or user players from a single opponent of a single contest that is actively being displayed in the interface 600. (i.e., 1 opponent, 8 opponent players and 8 user players using the examples above). Accordingly, methods for determining whether to present an animation 715 can include determining a configuration that a user interface 600 is in and determining whether an animation is eligible to be presented based on the configuration of the interface 600. Additionally, as discussed herein, animations 715 including non-opponent or non-user players may or may not be presented.

Moving into broader configurations can trigger presentation of queued play animations. For example, after viewing in interface 600 in single-opponent configuration, where plays related to other opponents are not being viewed, changing the interface to a contest-level configuration can trigger presentation of some or all animations that have not yet been displayed to the user.

Additionally, in various embodiments, plays can be replayed based on selections by the user in the interface 600. For example, if a user wants to view animations 715 from a certain period of time, the user can select playing animations starting at a desired time point (e.g., like playing a video). Additionally, in various embodiments, animations 715 can be filtered based on contest day, opponent, user player, opponent, sports team, player position, or the like. In further embodiments, play animations can be replayed by selecting tiles of the set of tiles 710.

Additionally, various other elements can be added to the set of tiles 710, or in other portions of an interface 600. For example, such information can include, but not limited to, movement in the user's position in one or more contest, information or statistics about one of a user's players (e.g., did you know, etc.), tweets by NFL players, touchdowns by any players in the NFL, and the like. In various embodiments, suitable animations 715 can be presented related to such information.

Additionally, in various embodiments displayed information can change based on team field position, time remaining in a game, score difference between teams, and the like. For example, where a user "owns" a football player in the currently displayed lineup, the interface 600 can display all plays for that player's real life team while his real life team is in the red zone (i.e., inside the opponent team's 20 yard line).

The following disclosure relates to one example embodiment for purposes of illustration only and should not be construed to be limiting on the wide variety of variations that are contemplated and are within the scope and spirit of the present invention. For example, although various examples herein relate to the sport of football, further embodiments can relate to any other suitable sport and can be configured for a plurality of sports or other events.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A system for providing a plurality of different customized display presentations for a sports contest, the system comprising:

a plurality of user devices, with each user device associated with a separate user account and with each user account associated with a sports contest associated with a plurality of sporting events, the sports contest comprised of at least one of the user accounts and at least one opponent user account, with each of the user accounts having a selection of a different plurality of user sports players for the sports contest and each of the opponent user accounts having a selection of a different plurality of opponent sports players for the sports contest, the sports players being human players in the sports contest that are remote from and do not control any of the plurality of user devices and are not associated with the separate user accounts of the respective plurality of user devices, the sports contest being a non-video game sports contest of at least one of the NFL, MLB, NBA or NHL that is not controlled by or otherwise influenced by the plurality of user devices nor the separate user accounts;

a statistics server located remotely from the plurality of user devices; and a gaming server located remotely from the statistics server and the plurality of user devices, wherein the system generates different customized display presentations for each of the user devices by:

receiving a first set of sports data from the statistics server at the gaming server, the first set of sports data associated with a first sporting event occurring in real time that is not controlled by or otherwise influenced by the plurality of user devices nor the separate user accounts, the first sporting event being one of the plurality of sporting events associated with the sports content;

parsing the first set of sports data;

generating a different customized presentation for each respective user account by, for each respective user account associated with the sports contest:

determining that at least a portion of the first set of sports data is associated with at least one user sports player for the sports contest, determining that at least a portion of the first set of sports data is associated with at least one opponent sports player for the sports contest, and generating a different customized presentation for the respective user accounts including an animation depicting a representation of the at least one user sports player for the sports contest and a representation of the at least one opponent sports player for the sports contest, wherein each of the different customized presentations are different based at least in part on the identity and different real-time game actions of the different plurality of user sports players for the sports contest of each of the user accounts and based at least in part on the identity and different real-time game actions of the different plurality of opponent sports players for the sports contest of each of the opponent user accounts;

identifying a respective user device associated with each generated different customized presentation for the respective user accounts;

sending each of the different customized presentations to the respective identified user devices; and displaying the respective different customized presentations at the respective user devices.

2. The system of claim 1, wherein the sports contest is a fantasy sports contest or a sports betting contest.

3. The system of claim 1, wherein the animation depicting the representation of the at least one user sports player for the sports contest and the representation of the at least one opponent sports player for the sports contest includes an animation of the at least one user sports player and the at least one opponent sports player acting in a sports play of the first sporting event.

4. The system of claim 3, wherein the at least one user sports player and the at least one opponent sports player are on the same sports team.

5. The system of claim 3, wherein the at least one user sports player and the at least one opponent sports player are on opposing sports teams of the first sporting event.

6. A computer implemented method of providing a plurality of different customized display presentations for a sports contest, the method comprising:

generating a different customized presentation for each respective user account of a plurality of user accounts, with each user account associated with a sports contest associated with at least one sporting event, the sports contest comprised of at least one of the user accounts and at least one opponent account, with each of the user accounts having a selection of one or more of user sports players for the sports contest and each of the at least one opponent accounts having a selection of one or more opponent sports players for the sports contest, the generating the different customized presentation for each respective user account of the plurality of user accounts comprising:

generating a different customized presentation for the respective user accounts including one or both of: a representation of at least one user sports player for the sports contest and a representation of at least one opponent sports player for the sports contest, wherein each of the different customized presentations are different based at least in part on the identity and different real-time game actions of the different plurality of user sports players for the sports contest of each of the user accounts and based at least in part on the identity and different real-time game actions of the different opponent sports players for the sports contest of the at least one opponent accounts, wherein the different customized presentation for the respective user accounts includes one or both of an animation depicting the representation of the at least one user sports player for the sports contest and the representation of the at least one opponent sports player for the sports contest, wherein the real-time game actions are part of a real-world sporting event including at least one of a real-world baseball, basketball, football, soccer, or hockey game being played by real-world sports players in a real-world sports environment, the real-world sports players not controlling or associated with the separate respective user accounts, and users associated with the separate respective user accounts unable to control by or otherwise influence the real-time game actions of the real-world sporting event, and wherein each of the different customized presentations are generated based a first set of sports data obtained from a statistics server, the first set of sports data associated with the real-world first sporting event occurring in real time and occurring contemporaneous with generation of the different customized presentations.

7. The computer implemented method of claim 6, wherein the opponent account is a house account such that the plurality of user accounts are competing against the house.

8. The computer implemented method of claim 6, wherein the sports contest is associated with only a single real-time sporting event.

9. The computer implemented method of claim 6, wherein the animation depicting the representation of the at least one user sports player for the sports contest and the representation of the at least one opponent sports player for the sports contest includes an animation of the at least one user sports player and the at least one opponent sports player acting in a sports play of the at least one sporting event.

10. A computer implemented method of providing a plurality of different customized display presentations for a sports contest, the method comprising:

generating a different customized presentation for each respective user account of a plurality of user accounts including one or both of: a representation of at least one user sports player for the sports contest and a representation of at least one opponent sports player for the sports contest, wherein each of the different customized presentations are different based at least in part on one or both of: the identity and different real-time game actions of the different plurality of user sports players for the sports contest of each of the user accounts and the identity and different real-time game actions of the at least one opponent sports player for the sports contest of the at least one opponent account, wherein the different customized presentation for the respective user accounts includes one or both of an animation depicting the representation of the at least one user sports player for the sports contest and the representation of the at least one opponent sports player for the sports contest, wherein the real-time game actions are part of a real-world sporting event occurring contemporaneously with generation of the different customized presentation for each respective user account of the plurality of user accounts, the real-world sporting event being played by real-world sports players in a real-world sports environment, the real-world sports players not controlling or associated with each respective user account.

11. The computer implemented method of claim 10, wherein the opponent account is a house account.

12. The computer implemented method of claim 10, wherein each user account is associated with a sports contest that is associated with at least one sporting event.

13. The computer implemented method of claim 12, wherein the sports contest is associated with only a single sporting event.

14. The computer implemented method of claim 12, wherein the sports contest comprises at least one of the user accounts and at least one opponent account.

15. The computer implemented method of claim 12, wherein each of the user accounts has a selection of one or more of user sports players for the sports contest and at least one opponent account has a selection of one or more opponent sports players for the sports contest.

16. The computer implemented method of claim 10, wherein the animation depicting the representation of the at least one user sports player for the sports contest and the representation of the at least one opponent sports player for the sports contest includes an animation of the at least one user sports player and the at least one opponent sports player acting in a sports play of the at least one sporting event.

17. The computer implemented method of claim 10, wherein the real-time game actions correspond to actions or events associated with one or more of the real-world sports players in the real-world sports environment, including one or more of:

interaction of the one or more of the real-world sports players with a real-world ball or real-world puck of the real-world sporting event, the one or more of the real-world sports players scoring points in the real-world sporting event with a real-world ball or real-world puck of the real-world sporting event, the one or more of the real-world sports players scoring points in the real-world sporting event based on interaction with a real-life goal line, real-life goal post, real-life base, real-life basket, or real-life goal of the real-world sporting event, or physical interaction of the one or more of the real-world sports players with another of the real-world sports players.

18. The computer implemented method of claim 10, wherein the real-time game actions are part of the real-world sporting event including at least one of a real-world baseball, basketball, football, soccer, or hockey game being played by the real-world sports players in the real-world sports environment.

19. The computer implemented method of claim 10, wherein generation of the different customized presentation for each respective user account of the plurality of user accounts is based a first set of sports data obtained from a statistics server.

20. The computer implemented method of claim 10, wherein users associated with each respective user account are unable to control the real-time game actions of the real-world sporting event.

* * * * *